United States Patent
Weber et al.

(10) Patent No.: US 8,682,851 B2
(45) Date of Patent: Mar. 25, 2014

(54) DEVICE SPECIFIC FOLDERS FOR BOOKMARK SYNCHRONIZATION

(75) Inventors: Arnaud Claude Weber, Saratoga, CA (US); Alex Neely Ainslie, San Francisco, CA (US); Roma Rajni Shah, San Francisco, CA (US); Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 251 days.

(21) Appl. No.: 13/287,007

(22) Filed: Nov. 1, 2011

(65) Prior Publication Data

US 2013/0110869 A1    May 2, 2013

(51) Int. Cl.
*G06F 17/30* (2006.01)

(52) U.S. Cl.
USPC ........... 707/639; 707/770; 707/822; 707/828; 709/218; 709/220; 709/227

(58) Field of Classification Search
CPC .................................. G06F 17/00; G06F 17/30
See application file for complete search history.

(56) References Cited

U.S. PATENT DOCUMENTS

| | | | | |
|---|---|---|---|---|
| 6,557,028 | B2 * | 4/2003 | Cragun | 709/205 |
| 7,032,177 | B2 * | 4/2006 | Novak et al. | 715/723 |
| 7,324,997 | B2 * | 1/2008 | Yamada | 1/1 |
| 7,523,096 | B2 * | 4/2009 | Badros et al. | 705/7.29 |
| 7,660,831 | B2 * | 2/2010 | Freedman | 707/621 |
| 7,711,707 | B2 * | 5/2010 | Kelley et al. | 707/622 |
| 7,739,410 | B2 * | 6/2010 | Freedman | 709/248 |
| 7,761,414 | B2 * | 7/2010 | Freedman | 707/610 |
| 7,778,971 | B2 * | 8/2010 | Freedman et al. | 707/620 |
| 7,779,028 | B1 * | 8/2010 | Kenderov | 707/769 |
| 7,805,403 | B2 * | 9/2010 | Freedman | 707/612 |
| 7,844,576 | B2 * | 11/2010 | Kruis et al. | 707/621 |
| 7,949,634 | B2 * | 5/2011 | Freedman | 707/620 |
| 7,962,450 | B2 * | 6/2011 | Kruis et al. | 707/621 |
| 7,991,738 | B2 * | 8/2011 | Freedman et al. | 707/620 |
| 8,001,077 | B2 * | 8/2011 | Kelley et al. | 707/614 |
| 8,015,170 | B2 * | 9/2011 | Badros et al. | 707/706 |
| 8,126,845 | B2 * | 2/2012 | Freedman | 707/621 |
| 8,150,830 | B2 * | 4/2012 | Badros et al. | 707/706 |
| 8,166,017 | B2 * | 4/2012 | Badros et al. | 707/706 |

(Continued)

OTHER PUBLICATIONS

"Opera Link—Access Your Favorite Websites Everywhere", retrieved from <http://www.opera.com/link>, Jun. 22, 2011.

(Continued)

*Primary Examiner* — Farhan Syed
(74) *Attorney, Agent, or Firm* — McDermott Will & Emery LLP

(57) ABSTRACT

Methods for storing Uniform Resource Identifiers (URIs) in a default storage location that is specific to the type of a device are provided. In one aspect, a method includes receiving a request for a device to store a URI, and providing a default storage location for storing the URI. The default storage location is selected based on the type of the device from among a plurality of default storage locations for storing URIs, each of the default storage locations being specific to a different type of device. Two or more associated devices of different types can access the other's default storage location. The default storage location for the corresponding device accessing its own storage location will be displayed as the primary storage location, and the default storage location for a non-corresponding device will be displayed as a secondary storage location. Systems, graphical user interfaces, and machine-readable media are also provided.

20 Claims, 5 Drawing Sheets

(56) References Cited

U.S. PATENT DOCUMENTS

| | | | |
|---|---|---|---|
| 8,171,109 B2* | 5/2012 | Schneider | 709/218 |
| 2002/0070963 A1* | 6/2002 | Odero et al. | 345/739 |
| 2003/0009521 A1* | 1/2003 | Cragun | 709/205 |
| 2003/0126599 A1* | 7/2003 | Novak et al. | 725/32 |
| 2005/0131866 A1* | 6/2005 | Badros et al. | 707/3 |
| 2006/0242161 A1* | 10/2006 | Ten Kate et al. | 707/100 |
| 2007/0078903 A1* | 4/2007 | Saito | 707/200 |
| 2007/0136305 A1* | 6/2007 | Kelley et al. | 707/10 |
| 2007/0136306 A1* | 6/2007 | Kelley et al. | 707/10 |
| 2007/0150930 A1* | 6/2007 | Koivisto et al. | 725/134 |
| 2008/0098039 A1* | 4/2008 | Kruis et al. | 707/201 |
| 2008/0163743 A1* | 7/2008 | Freedman | 84/609 |
| 2008/0168072 A1* | 7/2008 | Freedman | 707/100 |
| 2008/0168106 A1* | 7/2008 | Freedman | 707/201 |
| 2008/0168126 A1* | 7/2008 | Freedman | 709/202 |
| 2008/0168184 A1* | 7/2008 | Freedman et al. | 709/248 |
| 2008/0168291 A1* | 7/2008 | Freedman | 713/375 |
| 2008/0168292 A1* | 7/2008 | Freedman | 713/375 |
| 2008/0215553 A1* | 9/2008 | Badros et al. | 707/3 |
| 2008/0301222 A1* | 12/2008 | Schneider | 709/203 |
| 2009/0227238 A1* | 9/2009 | Baard | 455/414.2 |
| 2009/0327408 A1* | 12/2009 | Nagase et al. | 709/203 |
| 2010/0145908 A1* | 6/2010 | Freedman | 707/610 |
| 2010/0306170 A1* | 12/2010 | Freedman et al. | 707/621 |
| 2011/0016087 A1* | 1/2011 | Freedman | 707/617 |
| 2011/0035790 A1* | 2/2011 | Kruis et al. | 726/4 |
| 2011/0126003 A1* | 5/2011 | Engert | 713/156 |
| 2011/0145687 A1* | 6/2011 | Grigsby et al. | 715/206 |
| 2011/0225293 A1* | 9/2011 | Rathod | 709/224 |
| 2011/0258174 A1* | 10/2011 | Badros et al. | 707/706 |
| 2011/0276396 A1* | 11/2011 | Rathod | 705/14.49 |
| 2011/0276889 A1* | 11/2011 | Boshernitzan | 715/738 |
| 2011/0314008 A1* | 12/2011 | Badros et al. | 707/723 |

OTHER PUBLICATIONS

"How Do I Sync Firefox Between My Desktop and Mobile?", retrieved from <http://support.mozilla.com/en-US/kb/sync-firefox-between-desktop-and-mobile?s=sync+firefox+between+desktop+and+mobile&as=s>, Jun. 22, 2011.

"Comparison of Browser Synchronizers—Wikipedia, The Free Encyclopedia", retrieved from <http://en.wikipedia.org/wiki/Comparison_of_browser_synchronizers>, May 25, 2011.

Anonymous: "Opera Link", Opera Help, May 22, 2010, retrieved from <http://web.archive.org/web/20100522014738/http://help.opera.com/Linux/9.52/en/link.html>.

Wieland Belka: "Bookmarks in Opera", Opera Anwender FAQ, Sep. 18, 2004, retrieved from <http://www.belkaplan.de/opera/tutorial_5xx/bookmark.htm>.

* cited by examiner

DEVICE SPECIFIC FOLDERS FOR BOOKMARK SYNCHRONIZATION

BACKGROUND

1. Field

The present disclosure generally relates to the transmission of data over a network, and more particularly to the use of a computing device to communicate over a network.

2. Description of the Related Art

Users often save Uniform Resource Identifiers ("URIs" or "bookmarks") for web pages that they would like to return to when using a web browser. Users can save bookmarks in web browsers on their non-mobile devices, such as desktop computers, and separately save bookmarks in web browsers on their mobile devices, such as smartphones or tablets. As users tend to browse the World Wide Web more on their non-mobile devices than their mobile devices, users tend to save more bookmarks on their non-mobile devices.

In order to address the need of being able to access saved bookmarks across multiple devices, bookmark synchronization services are available in which all bookmarks across multiple devices are copied (or "synchronized") to each of the devices. As a result, a user browsing the World Wide Web on one device has a copy of bookmarks the user initially saved on all of the user's other devices. However, when the user is on a mobile device that has limited screen space and attempts to select from the user's bookmarks, the user must view all of the user's bookmarks from across all of the user's devices. This makes it difficult for the user to find any specific bookmark. Similarly, when the user attempts to view the bookmarks on a non-mobile device, the user sees bookmarks initially saved on the user's mobile device that are specific to the user's mobile device, such as bookmarks provided by the mobile device carrier that function only on the user's mobile device.

SUMMARY

According to one embodiment of the present disclosure, a computer-implemented method for storing URIs in a default storage location that is specific to the type of a device is provided. The method includes receiving a request for a device to store a URI for a web page, and providing a default storage location for storing the URI. The default storage location is selected based on the type of the device from among a plurality of default storage locations for storing URIs, each of the plurality of default storage locations being specific to a different type of device. Two or more associated devices of different types can access the other's default storage location of URIs, and the default storage location for the corresponding device accessing its own storage location will be displayed as the primary storage location for storing URIs for the corresponding device, and the default storage location for a non-corresponding device wilt be displayed as a secondary storage location for storing URIs for the corresponding device.

According to another embodiment of the present disclosure, a system for storing Uniform Resource Identifiers (URIs) in a default storage location that is specific to the type of a device is provided. The system includes a memory comprising a plurality of default storage locations for storing URIs, each of the plurality of default storage locations being specific to a different type of device, and a processor. The processor is configured to receive a request for a device to store a URI for a web page, and provide a default storage location for storing the URI. The default storage location is selected based on the type of the device from among the plurality of default storage locations for storing URIs. Two or more associated devices of different types can access the other's default storage location of URIs, and the default storage location for the corresponding device accessing its own storage location wilt be displayed as the primary storage location for storing URIs for the corresponding device, and the default storage location for a non-corresponding device will be displayed as a secondary storage location for storing URIs for the corresponding device.

According to a further embodiment of the present disclosure, a user interface for storing Uniform Resource Identifiers (URIs) in a default storage location that is specific to the type of a device is provided. The user interface includes a request interface for receiving a request for a device to store a URI for a web page, and a display interface for providing a default storage location for storing the URI in response to the request to store the URI for the web page. The default storage location is selected based on the type of the device from among a plurality of default storage locations for storing URIs, each of the plurality of default storage locations being specific to a different type of device. Two or more associated devices of different types can access the other's default storage location of URIs, and the default storage location for the corresponding device accessing its own storage location will be displayed as the primary storage location for storing URIs for the corresponding device, and the default storage location for a non-corresponding device will be displayed as a secondary storage location for storing URIs for the corresponding device.

According to yet a further embodiment of the present disclosure, a machine-readable storage medium comprising machine-readable instructions for causing a processor to execute a method for storing Uniform Resource Identifiers (URIs) in a default storage location that is specific to the type of a device is provided. The method includes receiving a request for a device to store a URI for a web page on the device, and providing, for display, a default storage location on the device for storing the URI in response to the request to store the URI. The default storage location is selected based on the type of the device from among a plurality of default storage locations on the device for storing URIs, each of the plurality of default storage locations being specific to a different type of device. Two or more associated devices of different types can access the other's default storage location of URIs, and the default storage location for the corresponding device accessing its own storage location will be displayed as the primary storage location for storing URIs for the corresponding device, and the default storage location for a non-corresponding device will be displayed as a secondary storage location for storing URIs for the corresponding device.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system designates a default folder for bookmarks based on the type of the device being used, and selects the default folder for automatic display to the user on the device when the user attempts to retrieve or store a bookmark. All of the bookmark folders, however, are synchronized across devices, so that the user has access to all of the user's bookmarks on any one device.

For example, when a user viewing a web page on a mobile device wants to store a bookmark for the web page, the user presses a button to save the bookmark. In response, the web browser on the mobile device displays a default folder "mobile" in which the user can save the bookmark on the mobile device. When the user wants to retrieve a bookmark on the mobile device, the web browser on the mobile device again displays the default folder "mobile," thereby limiting the display by default to just bookmarks for the mobile device. If the user wants to retrieve a bookmark originally saved on another device, the user can select the default folder for the other device for viewing on the mobile device.

Similarly, when a user viewing a web page on a non-mobile device chooses to store a bookmark for the web page, the web browser on the non-mobile device displays a default folder "general" in which the user can save the bookmark on the non-mobile device. When the user wants to retrieve a bookmark on the non-mobile device, the web browser on the mobile device again displays the default folder "general."

Although many examples provided herein describe a user's information (e.g., bookmarks) being stored in memory on a server), the user can, at any time, delete the user information from memory and/or opt out of having the user information stored in memory. Additionally, the user can, at any time, adjust appropriate privacy settings to selectively limit the types of user information stored in memory. The user information does not include and/or share the specific identification of the user (e.g., the user's name) unless otherwise specifically provided or directed by the user.

Figure 1:
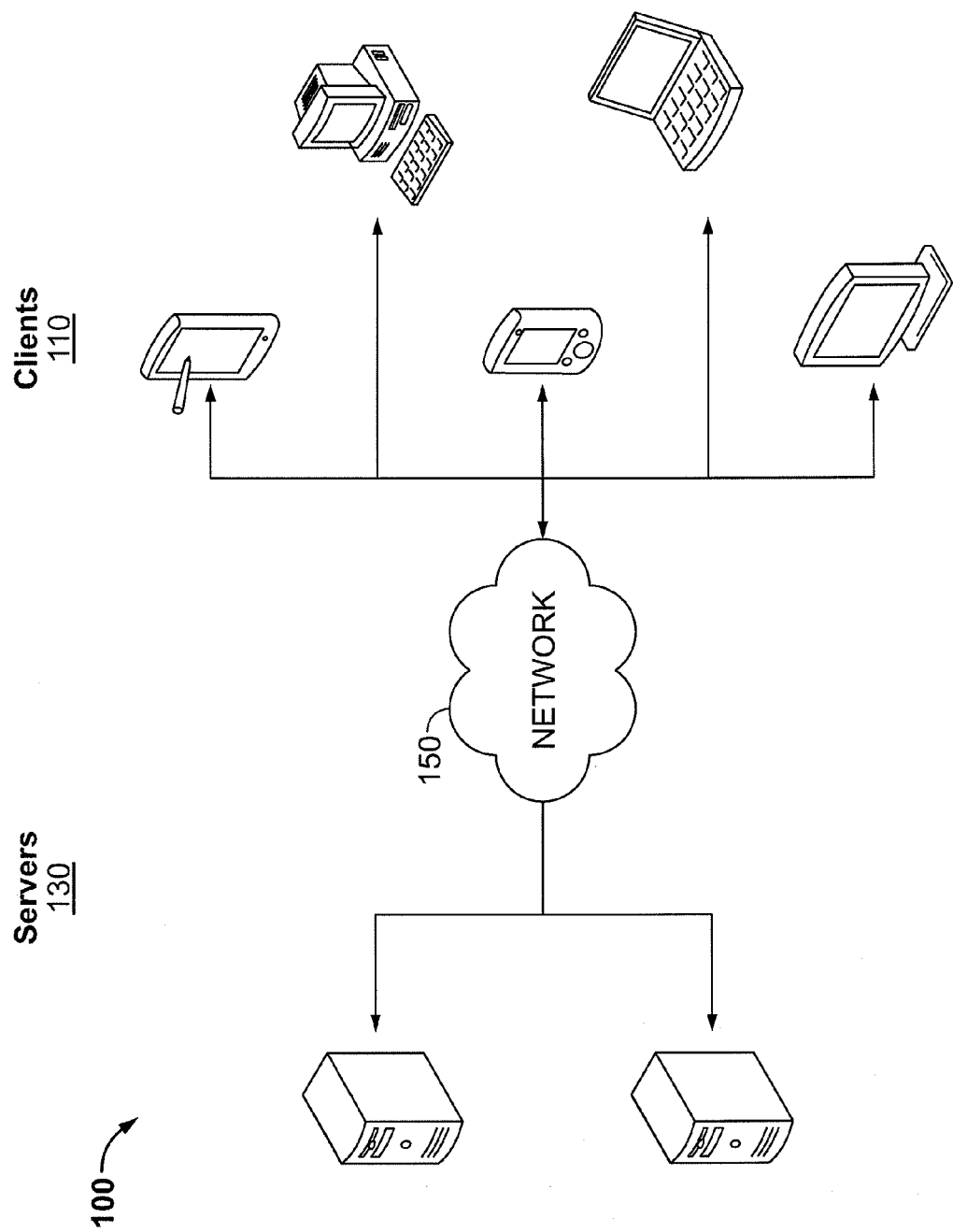
FIG. 1 illustrates an exemplary architecture for storing URIs in a default storage location specific to a device's type for two or more associated devices.

FIG. 1 illustrates an exemplary architecture 100 for storing URIs in a default storage location specific to a device's type for two or more associated devices. The architecture 100 includes servers 130 and clients 110 connected over a network 150.

One of the many servers 130 is configured to host centralized bookmark storage folders. The centralized bookmark storage folders are a central, authoritative copy of a users' bookmarks, and can be in the form of a database. For purposes of load balancing, multiple servers 130 can host the centralized bookmark storage folders. As discussed herein, the centralized bookmark storage folders are used to synchronize bookmarks among various devices of a user. Synchronization can occur on a periodic basis, such as by a client device periodically checking the centralized bookmark storage folders for any changes, and updating a local copy of the bookmark storage folders on the client device accordingly. Synchronization can also occur on a real-time basis, such as by a client device notifying the server hosting the centralized bookmark storage folders of any changes made by the user to the user's bookmarks, or the server notifying a client device of any changes made by the user to the user's bookmarks.

The system disclosed herein provides an electronic interface on a device for a user to save bookmarks to a default storage folder on the device that is automatically selected based on the type of the device. Thus, when a user on a non-mobile device wants to save a bookmark in a web browser, a default bookmark storage folder for the non-mobile device is automatically displayed in which the user can save the bookmark. Similarly, when a user on a mobile device wants to save a bookmark in a mobile bookmark application, a default bookmark storage folder for the mobile device is automatically displayed in which the user can save the bookmark. In either case, when the default bookmark storage folder for the device is displayed, the user can select a different bookmark storage folder to view. For example, although on a mobile device the default bookmark storage folder for the mobile device is displayed, the user can change folders to view, on the user's mobile device, the default bookmark storage folder for the user's desktop device. The folder the user changes to view can become the new default folder that is shown the next time the user chooses to store or view a bookmark on the mobile device. If the bookmarks are synchronized across the user's devices, then the user would be able to view, on the mobile device, the user's bookmarks in the default bookmark storage folder for the user's desktop device. As a result, the disclosed system facilitates the user's ability to better organize the user's bookmarks among the user's devices.

The servers 130 can be any device having an appropriate processor, memory, and communications capability for the centralized bookmark storage folders. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. Each type of device has its own corresponding default bookmark storage folders. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
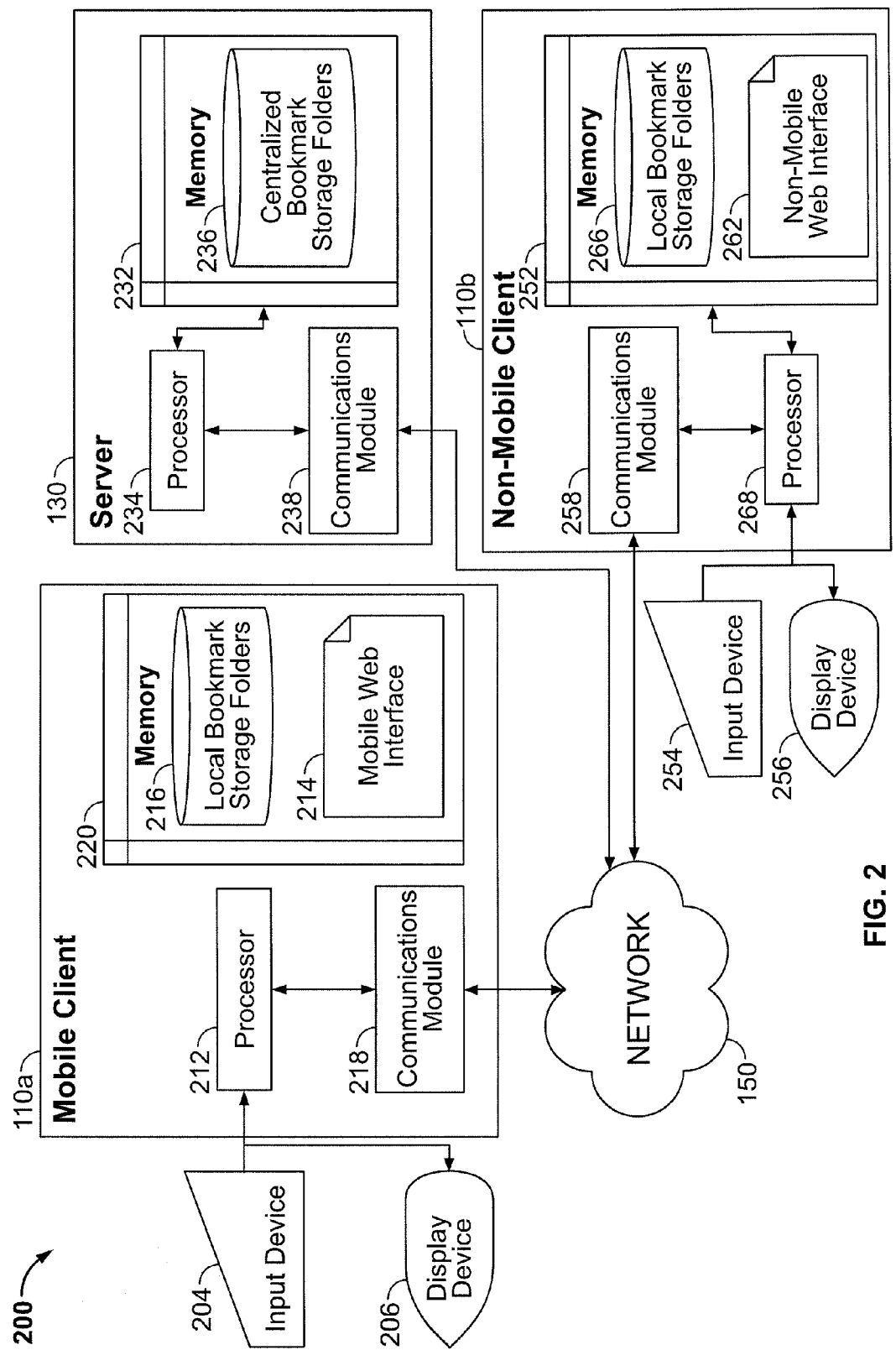
FIG. 2 is a block diagram illustrating the exemplary clients and server from the architecture of FIG. 1 according to certain aspects of the disclosure.

FIG. 2 is a block diagram 200 illustrating an exemplary server 130, mobile client 110a, and non-mobile client 110b in the architecture 100 of FIG. 1 according to certain aspects of the disclosure. The mobile client 110a, the non-mobile client 110b, and the server 130 are connected over the network 150 via respective communications modules 218, 258, and 238. The communications modules 218, 258, and 238 are configured to interface with the network 150 to send and receive information, such as data, requests, responses, and commands to other devices on the network. The communications modules 218, 258, and 238 can be, for example, modems or Ethernet cards.

The server 130 includes a processor 236, a communications module 238, and a memory 232 that includes the centralized bookmark storage folders 236. The server 130 synchronizes the centralized bookmark storage folders 236 with the mobile client 110*a* and the non-mobile client 110*b* as discussed above.

The mobile client 110*a* includes a processor 212, the communications module 218, and a memory 220 that includes a mobile web interface 214 and a local set of bookmark storage folders 216. The mobile client 110*a* also includes an input device 216, such as a touchscreen input, and an output device 214, such as a touchscreen display. The processor 212 of the mobile client 110*a* is configured to execute instructions, such as instructions physically coded into the processor 212, instructions received from software in memory 240, or a combination of both. For example, the processor 212 of the mobile client 110*a* executes instructions to receive a request on the mobile client 110*a* to store a URI for a web page. When the web interface 214 is a web browser or a URI management interface, the request can be a request to save a bookmark for the URI. The processor 212 of the mobile client 110*a* also executes instructions to provide a default storage location (e.g., storage folder) for storing the URI. The default storage location is selected based on the type of the client. In this instance, the type of the mobile client 110*a* is mobile. The default storage location is selected from among the local bookmark storage folders 216 for storing URIs, each of which is a default storage location specific to a different type of device. In certain aspects, the default, storage location is selected in advance, and providing the default storage location for storing the URI can include displaying the default storage location for storing the URI on the client 110*a* in response to the request to store the URI for the web page. The default storage location for a corresponding client device accessing its own storage location will be displayed as the primary storage location for storing URIs, and the default storage location for a non-corresponding client device will be displayed as a secondary storage location for storing URIs.

In the disclosed system, because bookmarks are synchronized across multiple clients using the centralized bookmark storage folder 236 on the server 130, two or more associated clients of different types can access the other's storage location of URIs with reference to their own local bookmark storage folders. For instance, when a change is made to the local bookmark storage folders 216 in the memory 220 of the mobile client 110*a*, the centralized bookmark storage folders 236 in the memory 232 of the server 130 are updated accordingly (e.g., in real-time or after a period of time, as discussed above). The centralized bookmark storage folders 236 in the memory 232 of the server 130 are then used to update the local bookmark storage folders 266 in the memory 252 of the non-mobile client 110*b*.

Accordingly, the processor 212 of the mobile client 110*a* is also configured to receive a request on the mobile client 110*a* to retrieve a URI for another web page initially stored by another type of device (e.g., the non-mobile client 110*b*), and provide the default storage location (e.g., the default storage location for the mobile client 110*a*) for the client 110*a* for storing a URI. The processor 212 is further configured to receive a request on the mobile client 110*a* to provide the default storage location for the other type of device (e.g., the non-mobile client 110*b*), and display, on the device, the default storage location for the other type of device (e.g., the non-mobile client 110*b*).

The non-mobile client 110*a*, which includes a processor 268, the communications module 258, and a memory 252, includes a non-mobile web interface 214 and a local set of bookmark storage folders 216 in the memory. The non-mobile web interface 214 of the non-mobile client 110*a* provides instructions to the processor 268 of the non-mobile client similar to the instructions described above with reference to the mobile web interface 214. Thus, the processor 268 of the non-mobile client 110*b* is configured similarly to the processor 212 of the mobile client 110*a*. The non-mobile client 110*b* includes an input device 254, such as a keyboard, and a display device 256, such as a monitor.

Figure 3:
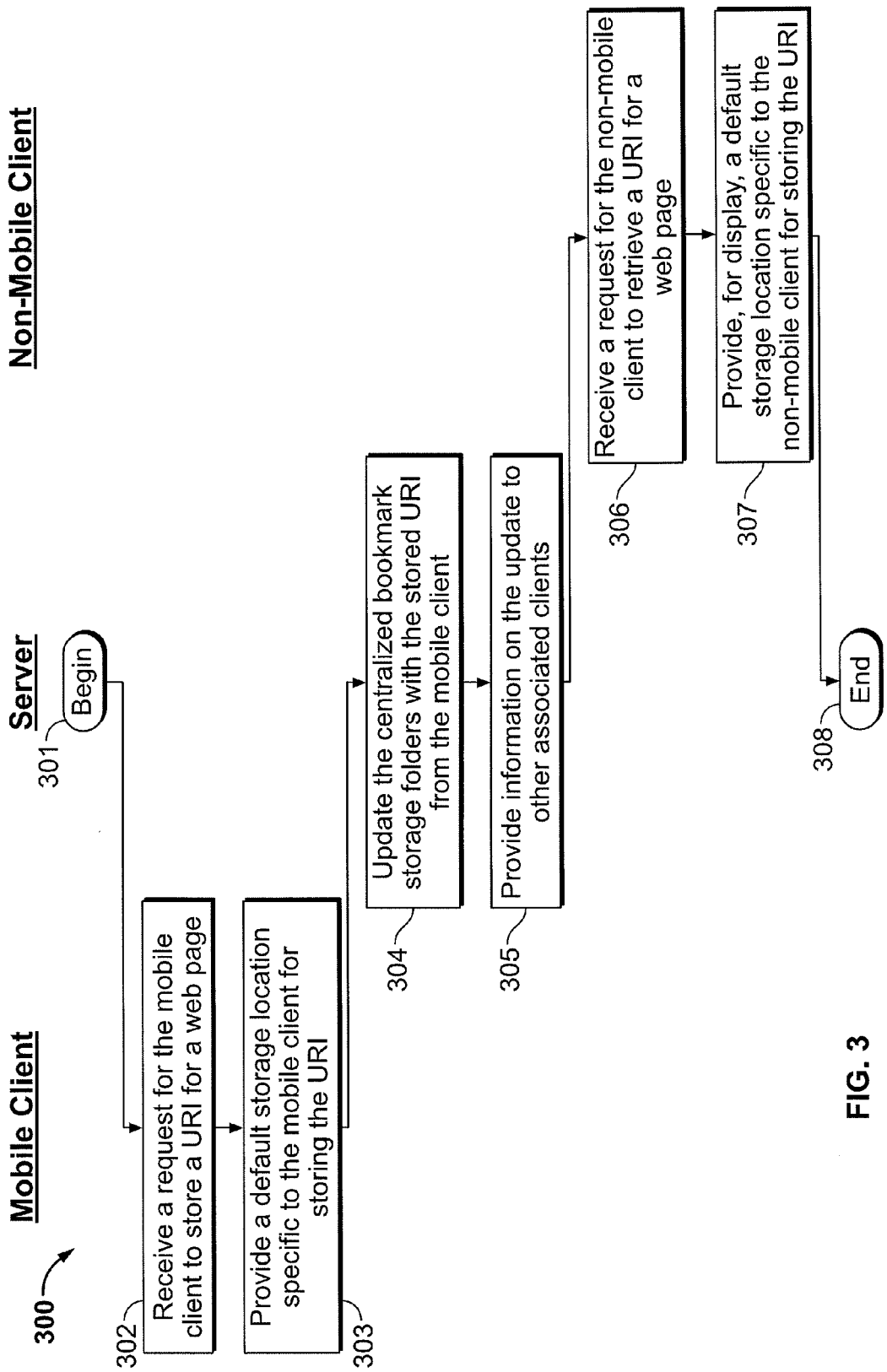
FIG. 3 illustrates an exemplary process for storing URIs in a default storage location specific to a device's type for two or more associated devices using the exemplary clients and server of FIG. 7.

FIG. 3 illustrates an exemplary process 300 for storing URIs in a default storage location specific to a device's type for two or more associated devices using the exemplary clients 110*a* and 110*b* and server 130 of FIG. 2. The process 300 proceeds from step 301 when the mobile web interface 214 is loaded on the mobile client 110*a* to step 302 when a request on the mobile client 110*a* to store a URI for a web page is received. In step 303, a default storage location (from among the local bookmark storage folders 216) specific to the mobile client 110*a* for storing the URI is provided. In steps 304 and 305, the process 300 turns to the server 130, where in step 304 the centralized bookmark storage folders 236 are updated with the stored URI from the mobile client 110*a*, and in step 305 the information on the update is provided to other associated clients (e.g., non-mobile client 110*b*). In step 306, the process 300 turns to the non-mobile client 110*b*, where a request on the non-mobile client 110*b* is received to retrieve a URI for a web page, and in step 307 a default storage location (from among the local bookmark storage folders 266) specific to the non-mobile client 110*b* for storing the URI is displayed. The process 300 then ends.

Figure 4:
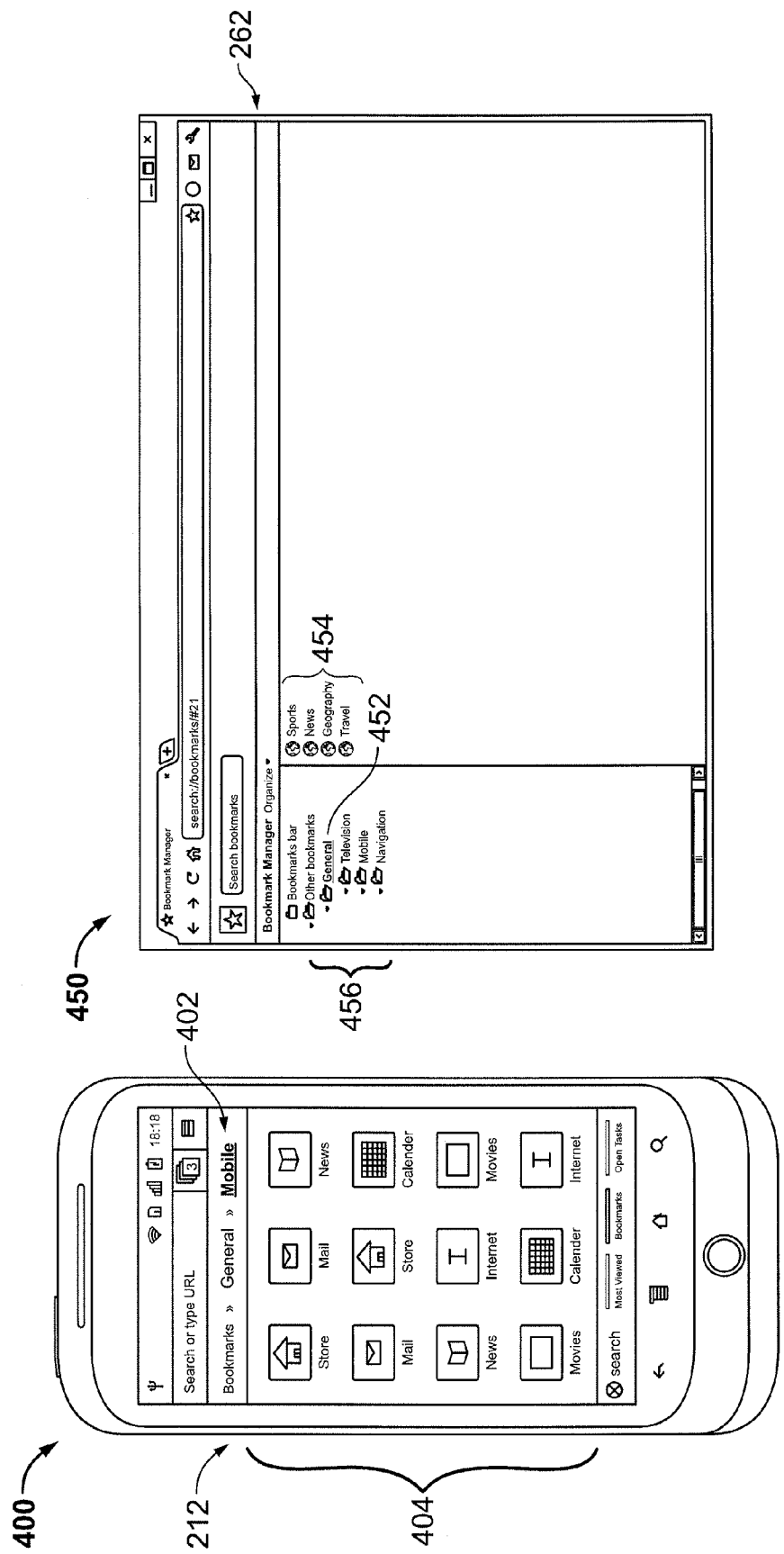
FIGS. 4A and 4B are exemplary screenshots associated with the exemplary process of FIG. 3.

FIG. 3 sets forth an exemplary process 300 for storing URIs in a default storage location using the exemplary mobile client 110*a*, non-mobile client 110*b*, and server 130 of FIG. 2. An example will now be described using the exemplary process 300 of FIG. 3, a mobile client 110*a* that is a smartphone, a non-mobile client 110*b* that is a desktop computer, and web interfaces 214 and 262 that are web browsers. The process 300 begins from step 301 when a mobile web browser 214 is loaded on the smartphone 110*a* to step 302 when a request on the smartphone 110*a* to store a bookmark for an email web page is received in the mobile web browser 214. In step 303, a default storage location specific to the smartphone (due to it being the type "mobile") for storing the bookmark is provided in the mobile web browser 214 from among the local bookmark storage folders 216. Specifically, as illustrated in FIG. 4A, an exemplary screenshot 400 of the mobile web browser 212, the bookmark for the email web page 406 is saved, along with previously existing bookmarks 404, in a default storage folder titled "Mobile" 402.

In steps 304 and 305, the process 300 turns to the server 130, where in step 304 the centralized bookmark storage folder "Mobile" (from among the centralized bookmark storage folders 236) is updated with the stored email web page bookmark from the smartphone 110*a*, and in step 305 the information on the update is provided to other associated clients (e.g., the desktop computer 110*b*).

In step 306, the process 300 turns to the desktop computer 110*b*, where a request on the desktop computer 110*b* is received in the non-mobile web browser 262 to retrieve a bookmark for a web page (from among the local bookmark storage folders 266), and in step 307 a default storage location specific to the desktop computer 110*b* (due to it being the type "non-mobile") for storing the bookmark is displayed in the non-mobile web browser 262. Specifically, as illustrated in FIG. 4B, an exemplary screenshot 450 of the non-mobile web browser 262, previously existing bookmarks 454 are displayed in the default storage folder for the desktop computer 110b titled "General" 452. If the user wishes to access the email bookmark 406 previously stored on the smartphone 110a, the user can browse to the "Mobile" folder in the listing of folders 456 displayed on the desktop computer 110b. The "Mobile" folder the user changes to view can then become the new default folder that is displayed the next time the user chooses to store or view a bookmark on the desktop computer 110b. The process 300 then ends.

Figure 5:
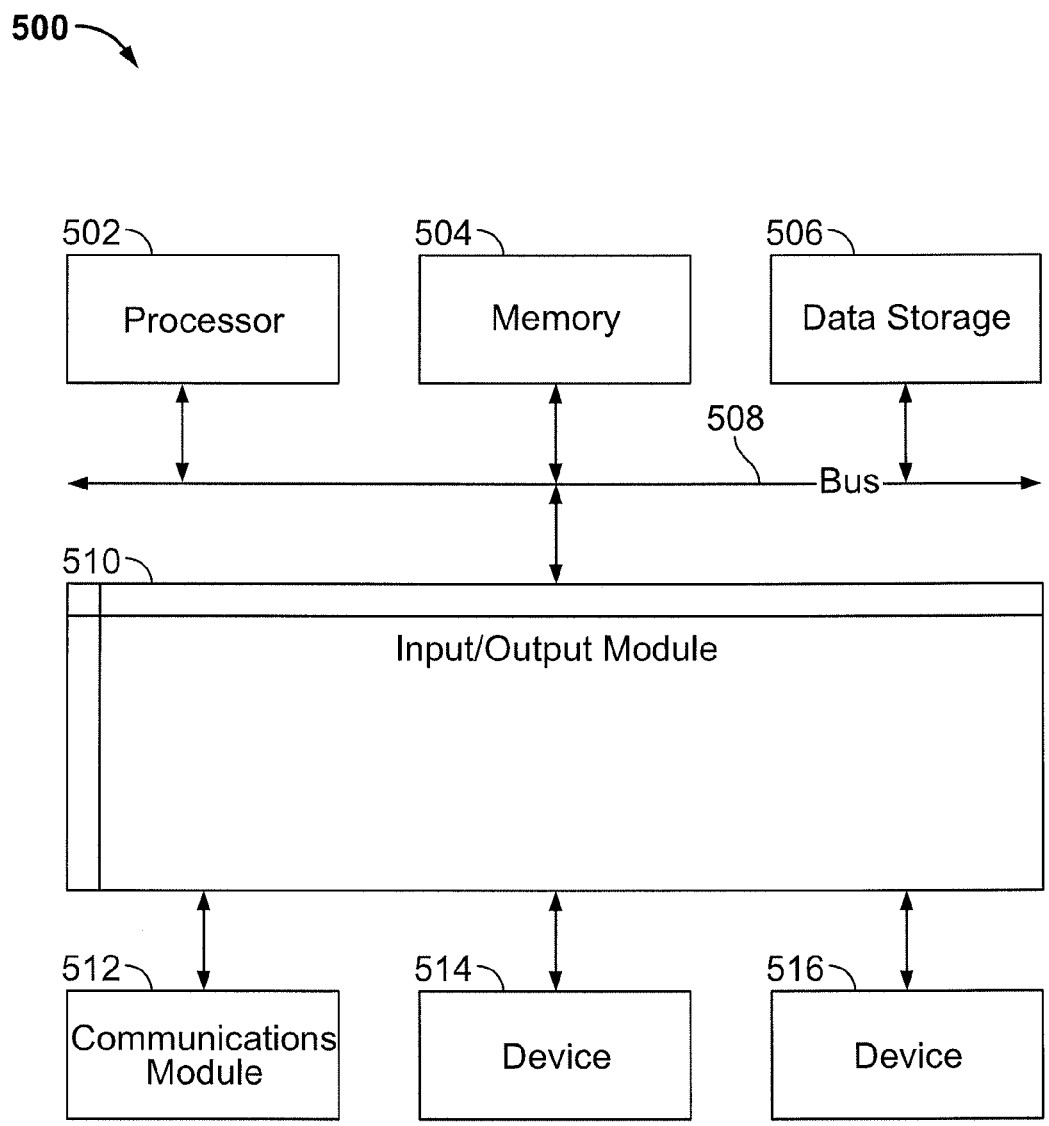
FIG. 5 is a block diagram illustrating an exemplary computer system with which the clients and server of FIG. 2 can be implemented.

FIG. 5 is a block diagram illustrating an exemplary computer system 500 with which the clients 110a and 110b and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., clients 110a and 110b and server 130) includes a bus 508 or other communication mechanism for communicating information, and a processor 502 (e.g., processor 212, 268, and 234) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220, 252, and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications module 218, 268, and 238) include networking interface cards, such as Ethernet cards and modems. In certain aspects, the input/output module 510 is configured to connect to a plurality of devices, such as an input device 514 (e.g., input device 204 and 254) and/or an output device 516 (e.g., display device 206 and 256). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the clients 110a and 110b and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, white operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, die processes depicted in die accompanying figures do not necessarily require the particular order shown, or sequential order, to achieve desirable results. In certain implementations, multitasking and parallel processing may be advantageous. Other variations are within the scope of the following claims.

These and other implementations are within the scope of die following claims.

What is claimed is:

1. A computer-implemented method for storing Uniform Resource Identifiers (URIs) in a default storage location that is specific to the type of a device, the method comprising:
   receiving a request for a device of a first type to retrieve a URI for a web page; and
   providing for display a default storage location as a primary storage location for retrieving the URI on the device of the first type in response to the request to retrieve the URI for the web page, the default storage location selected based on the type of the device from among a plurality of default storage locations for storing URIs, the plurality of storage locations comprising the default storage location and a secondary storage location on the device for storing URIs for a non-corresponding device of a second type,
   each of the plurality of default storage locations being specific to a different type of device, wherein two or more associated devices of different types can access the other's default storage location of URIs, and wherein the default storage location for the corresponding device accessing its own storage location will be displayed as the primary storage location on the corresponding device for storing URIs for the corresponding device, and the default storage location for the non-corresponding device will be displayed as the secondary storage location on the corresponding device for storing URIs for the corresponding device,
   and
   wherein the types of devices comprise a non-mobile device and a mobile device.

2. The computer-implemented method of claim 1,
wherein the request to retrieve the URI is for a web page initially stored by another type of device, and wherein the method further comprises:
receiving a request for the device to provide the default storage location for the other type of device; and
providing, for display on the device, the default storage location for the other type of device.

3. The computer-implemented method of claim 1, further comprising receiving a request for the device of the first type to store a URI for a web page, wherein the request to store the URI for the web page comprises a request in a web browser to save the URI for the web page.

4. The computer-implemented method of claim 1, wherein the default storage location is in a memory of the device.

5. The computer-implemented method of claim 4, wherein the plurality of storage locations in the memory of the device are synchronized with a plurality of storage locations on another type of device.

6. The computer-implemented method of claim 5, wherein the synchronization between different types of devices is based on a plurality of storage locations accessible to the different types of devices on a server.

7. The computer-implemented method of claim 3, wherein the default storage location for storing the URI on the device is selected prior to receiving the request to store the URI for the web page.

8. A system for storing Uniform Resource Identifiers (URIs) in a default storage location that is specific to the type of a device, the system comprising:
a memory comprising a plurality of default storage locations for storing URIs, each of the plurality of default storage locations being specific to a different type of device; and
a processor configured to:
receive a request for a device of a first type to retrieve a URI for a web page; and
provide for display a default storage location as a primary storage location for retrieving the URI on the device of the first type in response to the request to retrieve the URI for the web page, the default storage location selected based on the type of the device from among the plurality of default storage locations for storing URIs, the plurality of storage locations comprising the default storage location and a secondary storage location on the device for storing URIs for a non-corresponding device of a second type,
wherein two or more associated devices of different types can access the other's default storage location of URIs, and wherein the default storage location for the corresponding device accessing its own storage location will be displayed as the primary storage location on the corresponding device for storing URIs for the corresponding device, and the default storage location for the non-corresponding device will be displayed as the secondary storage location on the corresponding device for storing URIs for the corresponding device,
and
wherein the types of devices comprise a non-mobile device and a mobile device.

9. The system of claim 8, wherein
the request for the device to retrieve the URI is for a web page initially stored by another type of device, and wherein the processor is further configured to:
receive a request for the device to provide the default storage location for the other type of device; and
provide, for display on the device, the default storage location for the other type of device.

10. The system of claim 8, wherein the processor is further configured to receive a request for the device of the first type to store a URI for a web page, and wherein the request to store the URI for the web page comprises a request in a web browser to save the URI for the web page.

11. The system of claim 8, wherein the plurality of storage locations are synchronized with a plurality of storage locations on another type of device.

12. The system of claim 11, wherein the synchronization between different types of devices is based on a plurality of storage locations accessible to the different types of devices on a server.

13. The system of claim 10, wherein the default storage location for storing the URI on the device is selected prior to receiving the request to store the URI for the web page.

14. A user interface for storing Uniform Resource Identifiers (URIs) in a default storage location that is specific to the type of a device, the user interface comprising:
a request interface for receiving a request for a device of a first type to retrieve a URI for a web page; and
a display interface for providing, using a processor, a default storage location as a primary storage location for retrieving the URI on the device of the first type in response to the request to retrieve the URI for the web page, the default storage location selected based on the type of the device from among a plurality of default storage locations for storing URIs, the plurality of storage locations comprising the default storage location and a secondary storage location on the device for storing URIs for a non-corresponding device, each of the plurality of default storage locations being specific to a different type of device, wherein two or more associated devices of different types can access the other's default storage location of URIs, and wherein the default storage location for the corresponding device accessing its own storage location will be displayed as the primary storage location on the corresponding device for storing URIs for the corresponding device, and the default storage location for the non-corresponding device will be displayed as the secondary storage location on the corresponding device for storing URIs for the corresponding device,
and
wherein the types of devices comprise a non-mobile device and a mobile device.

15. The user interface of claim 14, wherein the user interface is a web browser.

16. The user interface of claim 14, wherein the plurality of storage locations are synchronized with a plurality of storage locations on another type of device.

17. The user interface of claim 14, wherein request interface is also for receiving a request for the device of the first type to store a URI for a web page, the default storage location for storing the URI on the device being selected prior to receiving the request to store the URI for the web page.

18. A non-transitory machine-readable storage medium comprising machine-readable instructions for causing a processor to execute a method for storing Uniform Resource Identifiers (URIs) in a default storage location that is specific to the type of a device, the method comprising:
receiving a request for a device of a first type to retrieve a URI for a web page on the device; and
providing for display a default storage location as a primary storage location on the device for retrieving the URI on the device of the first type in response to the request to retrieve the URI for the web page, the default storage location selected based on the type of the device from among a plurality of default storage locations for storing URIs, the plurality of storage locations comprising the default storage location and a secondary storage location on the device for storing URIs for a non-corresponding device, each of the plurality of default storage locations being specific to a different type of device, and wherein two or more associated devices of different types can access the other's default storage location of URIs, and wherein the default storage location for the corresponding device accessing its own storage location will be displayed as the primary storage location on the corresponding device for storing URIs for the corresponding device, and the default storage location for the non-corresponding device will be displayed as the secondary storage location on the corresponding device for storing URIs for the corresponding device, wherein the types of devices comprise a non-mobile device and a mobile device.

19. The computer-implemented method of claim 1, wherein the primary storage location on the corresponding device comprises a first URI storage folder, and the secondary storage location on the corresponding device comprises a second URI storage folder.

20. The system of claim 8, wherein the primary storage location on the corresponding device comprises a first URI storage folder, and the secondary storage location on the corresponding device comprises a second URI storage folder.

* * * * *